United States Patent [19]
Bourne

[11] 3,949,155

[45] *Apr. 6, 1976

[54] UNITARY ELECTRICAL RECEPTACLES

[76] Inventor: Richard Curtis Bourne, 1609 S. 23rd St., Lincoln, Nebr. 68502

[ * ] Notice: The portion of the term of this patent subsequent to Aug. 6, 1991, has been disclaimed.

[22] Filed: July 17, 1974

[21] Appl. No.: 489,424

Related U.S. Application Data

[63] Continuation of Ser. No. 377,094, July 6, 1973, Pat. No. 3,828,113.

[52] U.S. Cl. .................. 174/55; 174/65 R; 403/374
[51] Int. Cl.$^2$ ........................................... H02G 3/18
[58] Field of Search ............... 174/55, 58, 53, 65 R; 339/103 R, 119, 122 R, 123, 125 R, 126 R; 200/168 C, 168 D; 403/374

[56] References Cited
UNITED STATES PATENTS

| | | | |
|---|---|---|---|
| 1,835,554 | 12/1931 | Both | 174/55 X |
| 2,265,890 | 12/1941 | Bentley | 174/55 X |
| 2,437,802 | 3/1948 | Adler | 174/55 X |
| 3,125,629 | 3/1964 | Taylor | 174/53 |
| 3,488,428 | 1/1970 | Smith | 174/55 X |
| 3,828,113 | 8/1974 | Bourne | 174/55 |

FOREIGN PATENTS OR APPLICATIONS

| | | | |
|---|---|---|---|
| 1,029,067 | 4/1958 | Germany | 174/65 R |

Primary Examiner—C. L. Albritton
Assistant Examiner—David A. Tone
Attorney, Agent, or Firm—Stevens, Davis, Miller & Mosher

[57] ABSTRACT

A unitary electrical receptacle or switch for installation after finishing of the surface in which it is to appear, which comprises internal electrical conductors for such a receptacle or switch enclosed by electrically insulating material which is formed into a housing portion and a cover plate portion, with openings in said housing portion for insertion of distribution cable to make the desired electrical contact with the internal conductors, openings in the cover plate portion for insertion of a plug into the receptacle or for protrusion of switching means from switches, and through-holes for connecting the unitary receptacle or switch to a structural member. Means may also be included for firmly connecting the distribution cable to such a receptacle or switch.

The housing portion may be designed to straddle a structural member. The flanges formed by the cover plate portion overhanging the housing portion may be provided with shoulders adapted to the thickness of various surfacing materials.

10 Claims, 7 Drawing Figures

UNITARY ELECTRICAL RECEPTACLES

This is a continuation of application Ser. No. 377,094, filed July 6, 1973, now U.S. Pat. No. 3,828,113.

BACKGROUND OF THE INVENTION

This invention relates in general to electrical outlets, such as receptacles and switches, which are particularly advantageous for use in buildings of light-frame construction wherein the building framing is surfaced on two sides to form two substantially planar surfaces which are parallel to each other, and which enclose the framing structure. In the last 20 years, wages in virtually all construction trades have rapidly increased, and with these rapid increases in labor costs, ways must be found to reduce labor requirements in construction methods if inflation in building costs is to be controlled. One area where considerable labor reduction appears possible is in the installation of electrical distribution systems. Despite advances in wall construction methods, electrical outlets are still installed in much the same way as when electrical lines were first concealed in plaster walls at the turn of the century.

The earliest electrical systems were surface mounted, but it soon became common practice to install wiring in the voids between framing members to be concealed by the surface materials, with switches and receptacles still surface mounted. Soon public desires sought to finish these elements essentially flush with the surface to minimize visibility of the electrical distribution system. Plaster remained the most common wall and ceiling material for many years. As a wet process, plastering required the placement of a junction box to define a space within which the switch or receptacle element could be placed upon completion of the plastic surface. The junction box also accomodated the various circuit cables terminating at each switch or receptacle location, and excess wiring left to facilitate connections could be folded up in the back of the junction box behind the outlet element and cover plate. Because electrical outlets had to be fastened to a structural member, and because plaster could not easily be cut for the junction box after setting, junction boxes were installed prior to plastering. Electrical codes designed to protect the public soon came to require that all electrical connections (including those made to outlet elements) be made in approved junction boxes.

Electrical distribution systems were typically installed in buildings having plastered wall and ceiling systems over wood-frame construction in the following sequence: first, open-front metal junction boxes were fastened to wall studs or ceiling joists depending upon the desired function of the outlet (i.e. whether it was to be a receptacle, switch, lighting fixture, etc). Circuit wiring was then run between the framing members from the circuit panel to junction boxes and between such junction boxes. Wires were inserted in the junction boxes and clamped to the back or side thereof. Then, lath and plaster were placed around the opening defined by the front of the junction box, and the ends of the wires were stripped, connected to terminal screws on the receptacle or switch element, which was then fastened into the junction box. Finally, after the wall surfaces were painted, either a cover plate or fixture was installed to cover the exterior of the junction box.

During the 1950's, plaster surface techniques were virtually eliminated from wood-frame construction with the widespread acceptance of gypsum wallboard panels, which provide a smooth, planar interior wall surface similar to plaster, but with much less effort and at lower cost. However, the success of gypsum board did nothing to alter the installation sequence (which originated with wet plaster wall surfacing techniques) for the electrical distribution network, requiring a number of distinct operations by an electrician.

While junction boxes have traditionally been made of pressed or formed sheet metal, fiber glass reinforced junction boxes are now finding similar applications. Switch and receptacle elements installed in such junction boxes normally have a hard, insulating plastic body surrounding metal conductors, with exposed screws at their sides to which the wire leads are connected. However, recently switch and receptacle elements have appeared which replace the aforementioned more common screw-type terminals with plug-in-type devices which utilize a spring-type gripper to insure electrical contact. Some of the types of devices just discussed above herein are disclosed, for example, in Dorfman U.S. Pat. No. 2,428,110, Palmer U.S. Pat. No. 3,119,895, Schindler et al. U.S. Pat. No. 3,701,451, Osinski U.S. Pat. No. 2,397,688, and Smith U.S. Pat. No. 3,488,428.

Electrical outlet installation presently has unusually high labor content by comparison with other construction operations. This situation results both from the need for three or four trips by the electrician to each outlet location, as well as from the large amount of time required to connect and install the parts themselves at each such location. In addition to their high labor content, present electrical outlet systems have several other drawbacks. The finished appearance is often unsatisfactory due to installation of the receptacle or switch element at a slight angle (which determines the angle of the cover plate), or due to improper depth setting of the junction box such that the cover plate, the last item installed, does not fit flush against the wall surface. More importantly, present systems may present unnecessary safety hazards. Cover plates are rather simply attached and may easily be removed by children to expose bare conductors and terminal screws. Also, most present installations have considerable bare metal exposed behind the wall, including metal boxes, clamps, and fasteners which, in the event of a short circuit, could be a source of severe electrical shock to anyone coming into accidental contact with such exposed parts. Finally, present systems can cause great difficulty to repairmen in the event of a faulty wire between junction boxes. The wire cannot readily be removed and replaced without removing the junction box, yet the junction box cannot be removed without removing a portion of the wall. If the junction box could more easily be removed, the faulty wire could also be more easily replaced, including using it to pull a replacement wire through the same path, without requiring the removal of a portion of the wall around the junction box.

BRIEF SUMMARY OF THE INVENTION

It is, therefore, an object of this invention to provide an electrical receptacle which overcomes the above-noted disadvantages.

It is another object of this invention to provide a novel unitary electrical receptacle, which can be installed from the exterior after finishing of the surface in which the receptacle is to appear.

It is another object of this invention to provide a unitary electrical receptacle which may be installed with a minimum of effort in a minimum time.

It is a further object of this invention to provide a unitary electrical receptacle which may be installed at a desired location without the necessity of having the traditional electrical junction box previously installed at that location.

It is still another object of this invention to provide a unitary electrical receptacle having improved safety characteristics.

The following objects and others are accomplished in accordance with this invention by providing a unitary, pre-assembled electrical receptacle or switch for installation after finishing of the surface in which it is to appear, which comprises the internal electrical conductors for such a receptacle or switch enclosed by electrically insulating material which is formed into a housing portion and a cover plate portion, with openings in said housing portion for insertion of distribution cable to make the desired electrical contact with the internal conductors, openings in the cover plate portion for insertion of a plug into the receptacle or for protrusion of switching means from switches, and through-holes for connecting the unitary receptacle or switch to a structural member. Means may also be included from firmly connecting the distribution cable to such a receptacle or switch. The housing portion may be designed to straddle a structural member. The flanges formed by the cover plate portion overhanging the housing portiom may be provided with shoulders adapted to the thickness of various surfacing materials.

BRIEF DESCRIPTION OF THE DRAWINGS

For a better understanding of the invention as well as other objects and further features thereof, reference is made to the following detailed disclosure of preferred embodiments of the invention taken in conjunction with the accompanying drawings thereof, wherein.

DETAILED DESCRIPTION OF THE PREFERRED EMBODIMENTS

Figure 1:
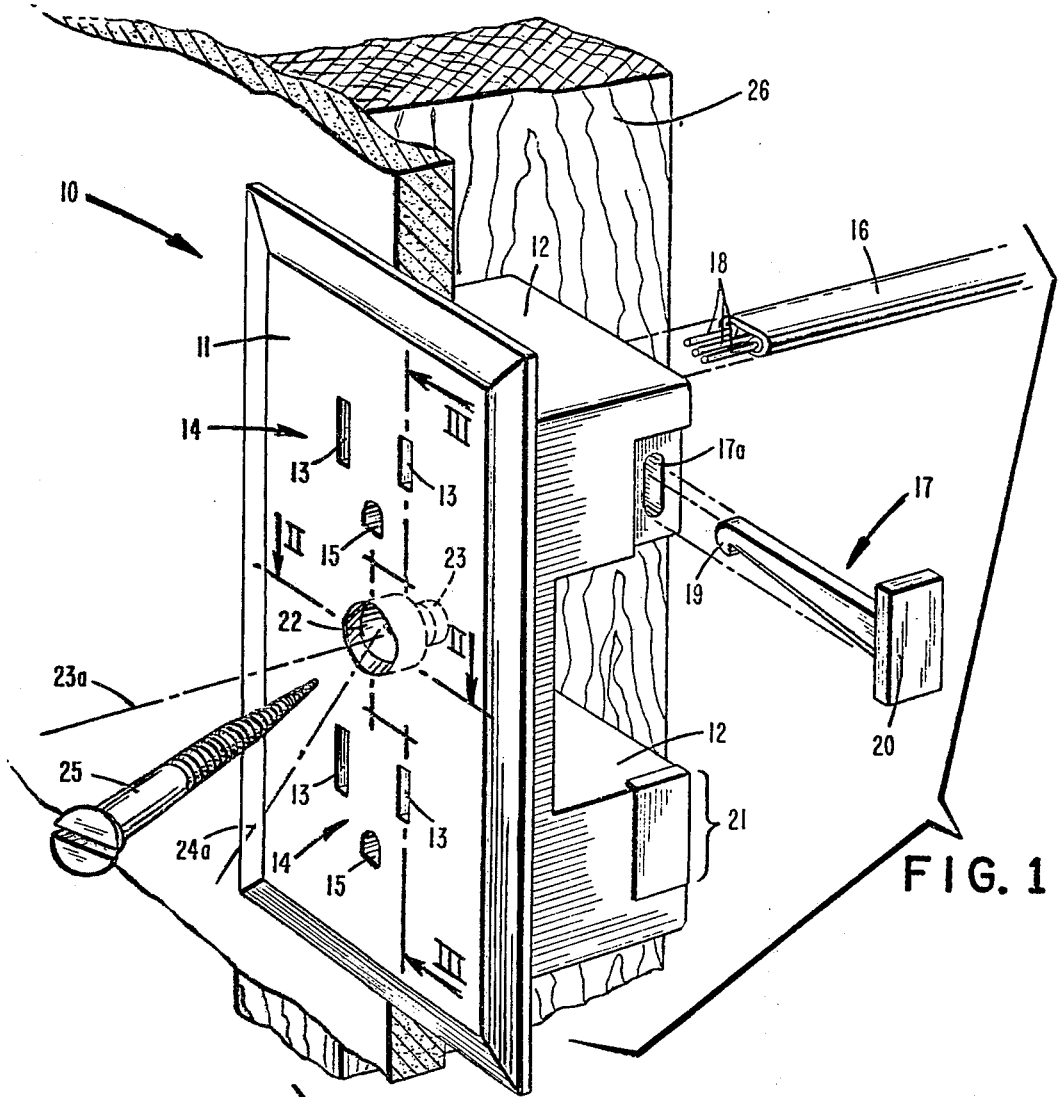
FIG. 1 is a partially schematic, isometric view of the exterior of the unitary electrical receptacle of the present invention showing the distribution cable, means for securing said cable to the receptacle, and means for attaching the receptacle to a structural member, all in exploded positions spaced from the body of the receptacle.

FIG. 1 illustrates a particularly preferred embodiment of the advantageous unitary electrical receptacle 10 of the present invention showing cover plate portion 11 and housing portion 12. Cover plate 11 is illustrated with groups of female receptacle openings 13 therein to receive the prongs of plugs on electrical cords which supply electricity to electrical devices. The pairs of elongate openings 14 are accompanied by a third opening 15 which is a female receptacle for the third prong or ground prong of a three-prong electrical plug.

The housing portion is typically centered on the back of the cover plate portion 11, and contains the internal electrical conductors within the receptacle. The internal conductors may be connected to the distribution cable shown at 16, at the rear of the housing portion of the unitary structure, and contacted by the prongs of a plug inserted in the female receptacle openings 13 in the cover plate portion of the receptacle. Also shown in FIG. 1 is wedge-shaped locking key member 17 which is used to connect the distribution cable 16 to the unitary receptacle 10. After the lead ends of conductors 18 of the distribution cable 16 have been bared and cropped to suitable length, the cable end is inserted in an opening on the back of the housing portion 12, and thereafter, the wedge-shaped locking key 17 is inserted into opening 17a which opens at the side of the housing portion 12. The wedge portion of key 17 wedges the cable 16 against the housing portion 12, and the tip 19 of key 17 locks the key in place thereby firmly connecting distribution cable 16 in and to the receptacle 10. Key 17 is shown with a rectangular end plate 20 which may be recessed into the housing portion 12, as shown at area 21 in FIG. 1. In other embodiments it may be desirable to use a serrated or roughened edge on key 17 to help secure the cable to the receptacle.

In addition, FIG. 1 illustrates the front opening 22 of a through-hole 23 for attaching the receptacle 10 to a structural member in light-frame structures.

The term "light-frame" structure or construction, is used herein to include any structure having structural framing members, i.e. studs or joists, covered by surfacing materials; such members or materials may comprise wood, metal, or other suitable material. Through-hole 23 is shown passing through receptacle 10 along an axis which is perpendicular to the plane of cover-plate 11. However, the inventive structure may also include a second through-hole, not illustrated in FIG. 1 (see FIG. 2), but which lies along an axis oriented approximately in the direction of axis 24a also shown passing through the center of opening 22. Also illustrated in FIG. 1 is screw 25 which may be used in either hole 23 along axis 23a, or in the oblique hole having axis 24a, to attach the unitary receptacle either to a stud which is straddled by the housing portion of the unitary receptacle, or to a stud or other structural member which is located beside the receptacle (behind from the point of view of the viewer of FIG. 1), respectively.

Figure 2:
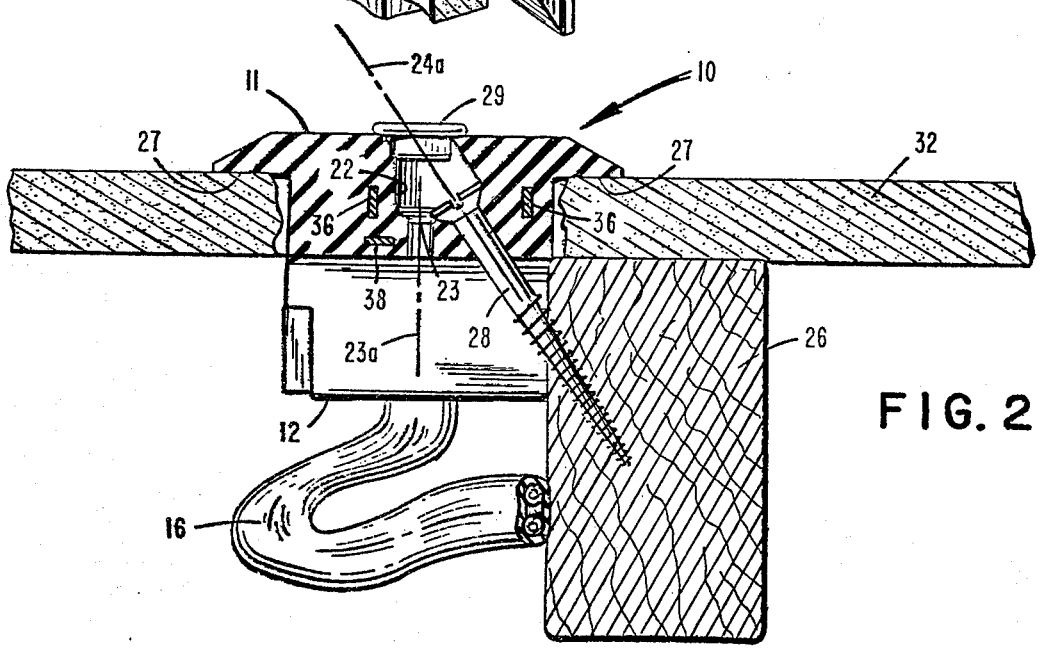
FIG. 2 is a partially schematic, cross-sectional view of the receptacle taken along line II—II in FIG. 1, the receptacle shown being attached in its side-attachment mode to a structural member in a light frame structure.

This latter orientation and manner of securing the unitary housing 10 to a stud 26 is illustrated in the cross-sectional view of FIG. 2, which is taken along line II—II of FIG. 1. FIG. 2 also shows the relationship of the cover plate portion 11 to the body portion 12 of the receptacle. Flanges 27 of cover plate portion 11 insure concealment of the hole in the wallboard or paneling into which the receptacle is installed. In addition, this view shows a screw 28 lying along axis 24a, which is oblique to axis 23a, with the screw 28 emerging at the side of the unitary receptacle, and boring into the stud 26 thereby securing the receptacle to the stud in a side-saddle fashion. Small button or cover 29 can be inserted within opening 22 to improve the exterior appearance, hiding the head of the screw which attaches the unitary structure to the wall construction.

It is in FIG. 2 that one can clearly see that the advantageous unitary receptacle structure of the present invention is in itself a replacement for such separate pieces as the junction box, internal screw-terminal receptacle, and exterior cover plate. As shown in FIG. 2, the unitary receptacle 10 does away with the need for a separate junction box and cover plate, while providing completely enclosed electrical connections for receiving common electrical plugs, said unitary receptacle being specifically designed for installation from without the light-frame construction after the surface paneling has been finished.

It will be clear to one familiar with this art that the unitary receptacle of the present invention is installed by procedures which include leaving a convenient length of excess distribution cable at each outlet location, precutting a hole in the surfacing material adjacent to a structural member at the desired outlet location, through which hole the excess distribution cable may protrude. The end of the cable is then prepared and attached to the unitary outlet assembly as described later herein, and thus the electrically connected assembly is then inserted into the precut hole in the wall panel with the cover plate flange fitting against the surface of the panel, and the unitary receptacle is fastened in place by driving a screw at an angle through the assembly into the adjacent structural member.

In the embodiment shown in FIG. 2, screw 28 is preferably oriented in an angle of about 55° to the surface of the cover plate portion of the receptacle. While a screw is the preferred fastening means because it permits removal and replacement of the receptacle, where service is not a major consideration, a nail-type fastener will permit more rapid installation.

For embodiments of the present invention wherein the housing portions are located adjacent a structural member such as a stud, the angle of the fastening means should be carefully chosen. Too steep an angle (i.e. approaching 90° to the wall surface) prevents centering of the entrance hole in the covering plate portion and presents a more difficult drilling problem in preparing the structural member to which the receptacle is to be fastened, due to the very low angle of the proposed hole to the surface of the structural member being drilled. Similarly, a very low angle to the wall surface requires a very large hole in the cover plate to permit passage of the head of the fastening screw. The angle of the fastening screw to the plane of the surface panel, or to the plane of the cover plate portion of the receptacle, should normally fall within a range between about 45° and 65°.

Figure 3:
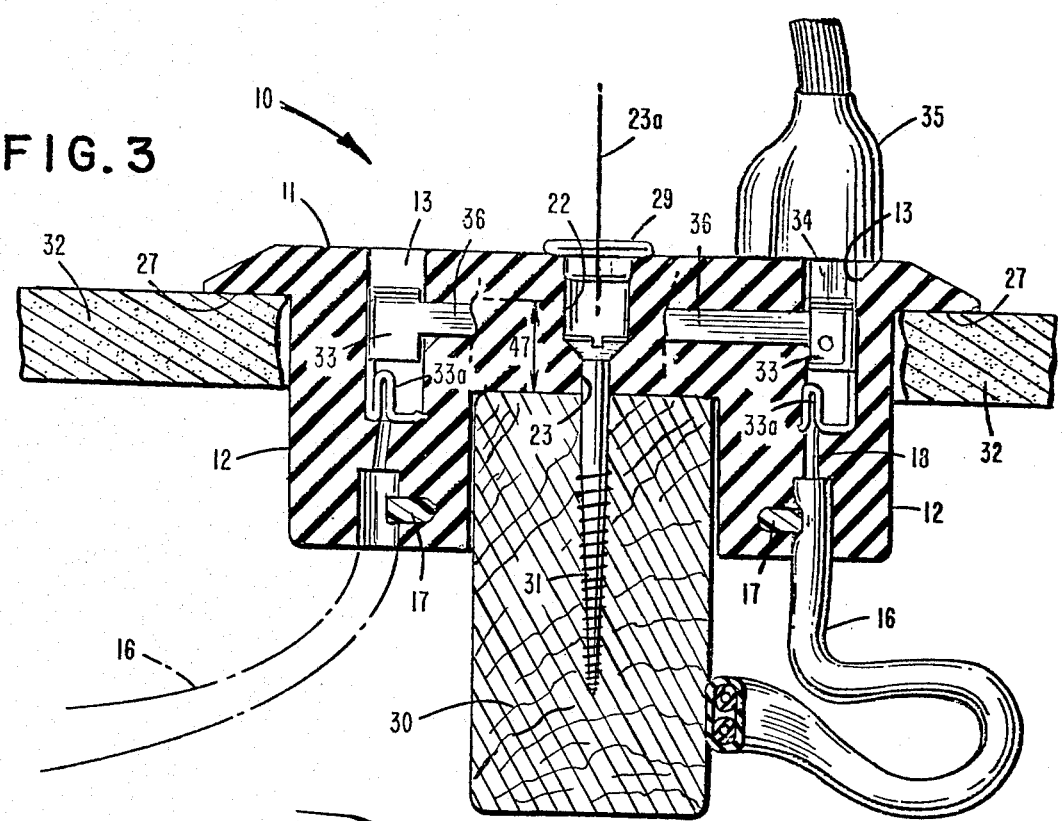
FIG. 3 is another partially schematic, cross-sectional view of the receptacle taken along the line III—III in FIG. 1, showing the receptacle straddle-mounted on a structural member.

FIG. 3 shows still another cross-sectional view of the unitary receptacle structure illustrated in FIG. 1, this cross-section having been taken along the line III—III shown on FIG. 1. FIG. 3 illustrates receptacle 10 straddle-mounted on stud 30 by screw 31 in through-bore 23 along axis 23a. Button or cover 29 is again illustrated in opening 22. Flanges 27 are again shown flush against the surface material 32. It will be appreciated that the saddle-type form of the housing portion 12 of the unitary structure 10 provides a means for controlling the orientation of the unitary structure with respect to the wall surface in which it is being installed. The cooperation of the saddle-form device with a structural member, orients the cover plate portion 11 so that its edges are parallel to the structural member. Similarly, as shown in FIG. 2, when the unitary receptacle is attached in side-saddle fashion to the side of the stud 26, the alignment of the unitary structure, and therefore, necessarily the alignment of the edges of the face plate portion thereof, are substantially parallel to the structural member 26. In this way, the present invention eliminates the problem of an askew or otherwise improperly oriented junction box causing a separate cover plate attached thereto to necessarily assume an askew position.

The cross-sectional view of FIG. 3 again illustrates that the present invention eliminates the need for separate elements such as: a junction box, an internal receptacle, and an exterior cover plate, and replaces those separate elements with the advantageous unitary, externally installable receptacle. Further FIG. 3 show female receptacle openings 13 including tangs 33 which are the contact portions of the internal electrical conductors of the receptacle, which tangs 33 make contact with the prongs 34 of an electrical plug 35 shown plugged into the inventive receptacle at the upper right hand portion of FIG. 3. Also shown in FIG. 3 is the point of connection 33a between the internal electrical conductors with the lead portions 18 of distribution cable 16 which is shown secured into the back side of the housing portion 12 by means of the wedge-key 17. The lead portions 18 may be electrically connected to the internal conductors at the bases 33a of the tangs by wedging into the folded conductor or between the conductor and the adjacent surface of the housing, or by being punched through pre-slitted openings to receive and retain said lead portions in contact with the internal conductors. If the fit between the distribution cable and receptacle is sufficiently snug, the receptacle may be used without wedge-key 17.

Figure 4:
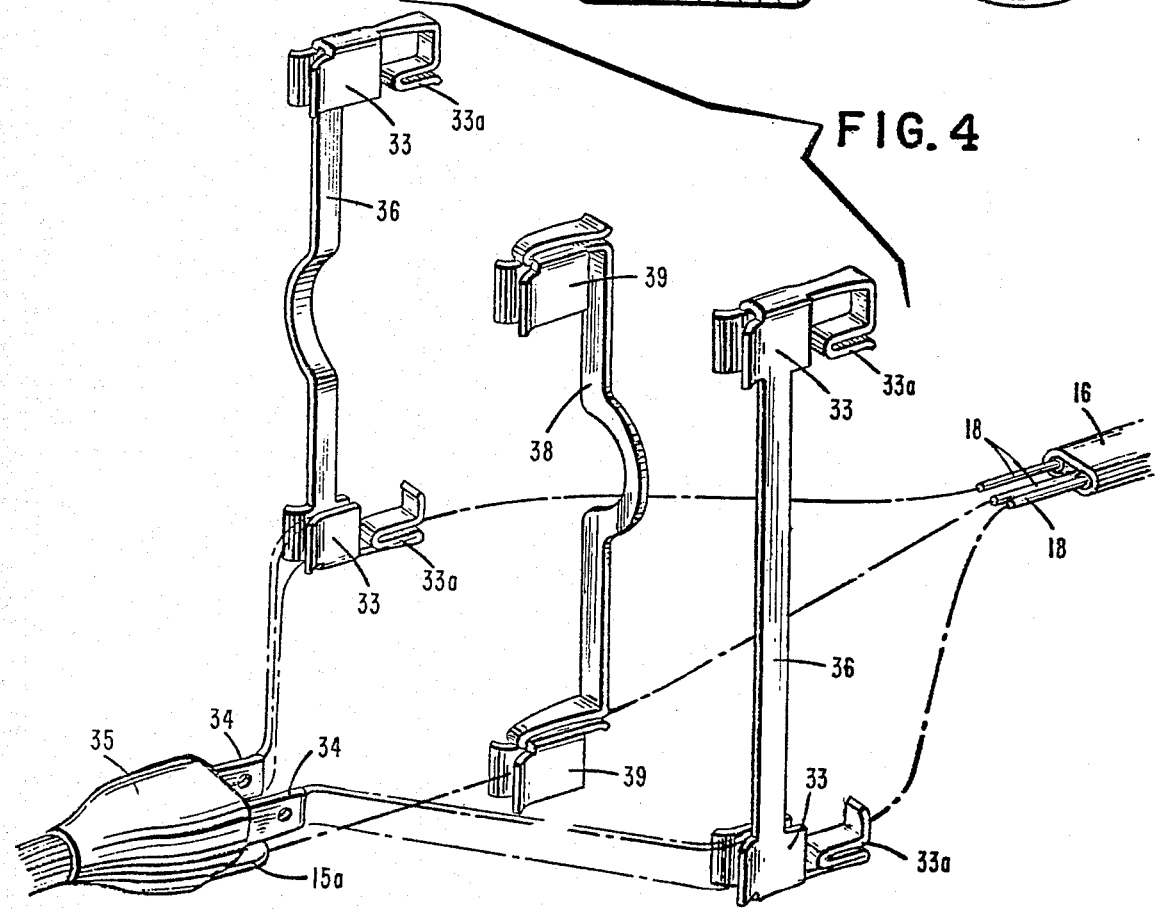
FIG. 4 is a partially schematic, exploded view of the internal conductors of the receptacle of FIG. 1, showing how a distribution cable and electrical plug relate thereto.

FIG. 4 schematically illustrates the structure of the internal electrical conductors enclosed within the unitary receptacle. Previously mentioned tangs 33 are shown as the outwardly bent portions of the ends of the two main conductors which are joined by a long conductor portion 36. The tips 33a of these conductors are the contact points at which the leads 18 of distribution cable 16 make electrical contact to energize the internal conductors of the unitary receptacle. Also illustrated in FIG. 4 is the ground conductor 38 each end of which is appropriately formed into a tang 39 which serves both as the contact point which may be contacted by a plug prong 15a inserted in female receptacle opening 15 (see FIG. 1) and which is the external contact point for a ground wire (having lead 18a) from distribution cable 16. Ground conductor 38 is illustrated as having a semicircular central portion which circumvents through-hole 23 in the center of the housing portion of the inventive unitary structure.

Figure 5:
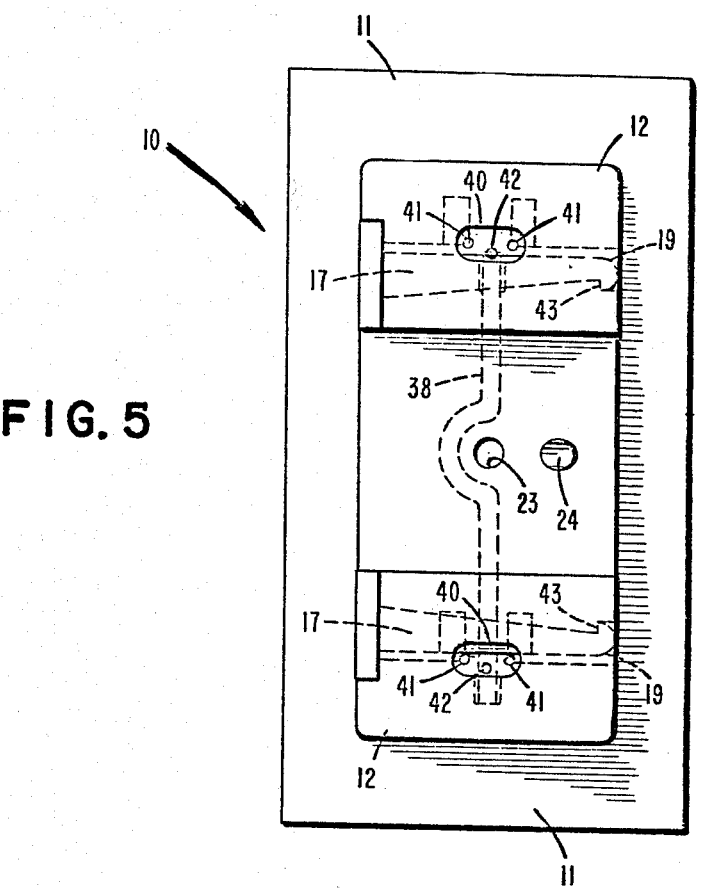
FIG. 5 is a partially schematic back view of the receptacle shown in FIG. 1.

The points at which the leads 18 and distribution cable 16 are inserted into the back side of the unitary structure 10 are more clearly illustrated in the back view of FIG. 5. FIG. 5 shows holes 40 with oval or oblong cross-sections, and which penetrate into the back side of the housing portion 12 of the unitary structure a sufficient depth for clamping of the distribution cable 16. At the bottom of the bores 40 are further holes 41 through which the lead ends of conductor wires 18 of cable 16 pass to make contact with the contact points 33a of the internal electrical conductors as described in conjunction with FIG. 4. Similarly, holes 42 provide passage for a ground wire from cable 16 to make contact with the end tangs 39 of ground conductor 38 of the internal electrical conductors (as previously shown in FIG. 4). FIG. 5 also illustrates the position of wedge-keys 17 in their fully inserted position, showing how the tips 19 thereof lock the wedge-keys 17 in place. It will be appreciated that to unlock the wedge-key 17, one need only press tip 19 away from the ledge-catch 43 and remove the wedge-key 17 from the opposite end of the tapered hole into which it fits.

The wedge-key may be molded of a suitable rigid, electrically insulating material such as plastic, and should have a wedge angle of approximately 5°. To accomodate cables of varying sizes, a series of wedges would be used, all with the same width, length, and wedge angle, but with varying depth related to cable thickness. The various wedge sizes could be color-coded for rapid identification. Unlike conventional screw-type clamps, the wedge-key assures uniform pressure from one installation to another, thus minimizing the liklihood of accidentally cutting through the cable insulation to contact the conductor. If, however, the insulation were accidentally penetrated, the insulated system would limit the chance of current being conducted outside the receptacle enclosure.

Taking the disclosures of FIGS. 3, 4, and 5 together, it can be seen that a unitary receptacle of the present invention installed in the manner illustrated in FIG. 3 can be connected to a cable 16 at either end of the housing portion 12, thereby providing electricity to both sets of female receptacle openings 13. The unitary receptacle of the present invention may serve to bridge the gap across a straddled stud thereby providing a contact point from which a distribution cable may provide electricity to additional outlets without the necessity of boring a hole through the stud upon which the unitary receptacle is mounted.

Figure 6:
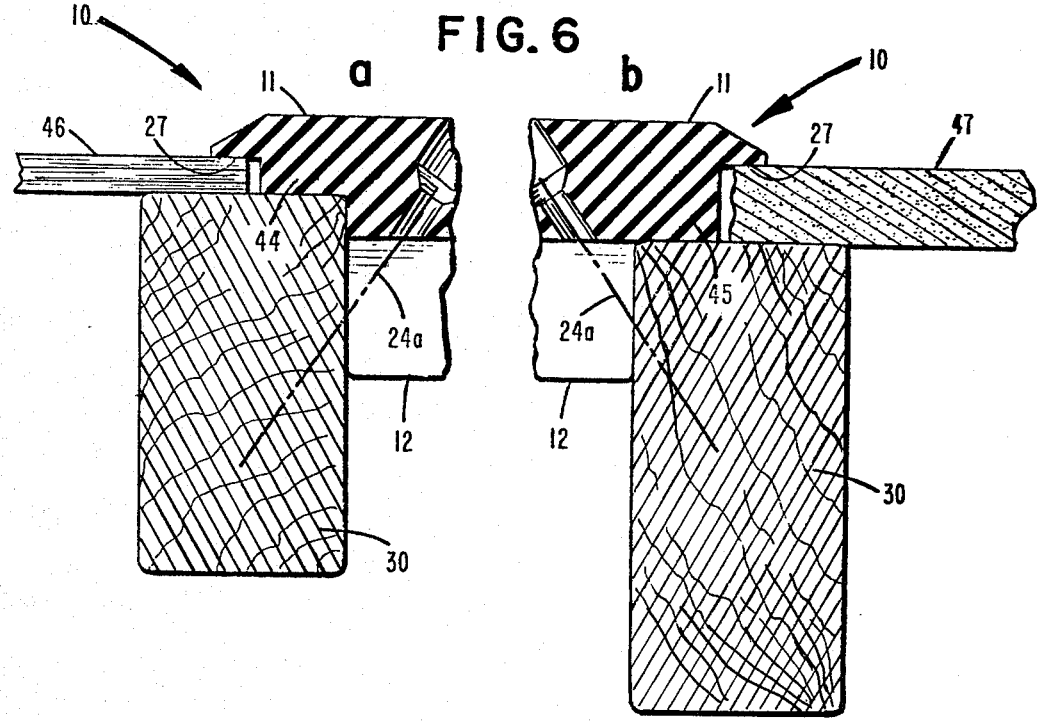
FIGS. 6a and 6b are partially schematic, cross-sectional views of other embodiments of the receptacle of the present invention, similar to that shown in FIG. 1, but illustrating shoulders formed at the junction of the cover plate portion and the housing portion of the receptacle, said shoulders corresponding in thickness to different thicknesses of surface materials used in light-frame construction.

FIGS. 6a and 6b show side by side cutaway views of two examples of other embodiments of the unitary receptacle wherein the flanges 27 formed by the cover plate portion 11 are provided with shoulders 44 and 45 adapted to the thickness of surface materials 46 and 47, respectively, so that when receptacle 10 is attached in the side-saddle mode (by means of a screw directed along the direction of axis 24a boring into stud 30,) the flange 27 is maintained a distance equal to or slightly less than the thickness of the surfacing material 46 or 47, by shoulder 44 or 45, respectively. It will, of course, be appreciated that the distance of the flanges 27 from the stud 30 in the case where the unitary receptacle is mounted in straddle-fashion on a stud 30 is defined by the thickness 47 (see FIG. 3) of the center of the housing portion of the unitary structure. In various embodiments of the present invention, the thickness of the center of the housing portion (i.e. distance 47 in FIG. 3) or, the thickness of a peripheral shoulder (44 or 45 in FIG. 6) may be varied as desired to accomodate the thickness of the surfacing material used in the particular frame construction.

The advantageous unitary receptacles of the present invention may be made by any suitable method and from any suitable materials, so long as the result is an pre-assembled receptacle structure having internal electrical conductors enclosed within an electrically insulating unitary body comprising a face plate portion and a housing portion, which respectively have openings therein to receive the prongs of an electrical plug, and the lead ends of a distribution cable. Well known techniques of molding electrically insulating materials such as hard rubber, or any one of a variety of synthetic resin thermoplastics or thermosetting materials may be suitable for use in the manufacture of the inventive receptacles. For example, one side of a mold can be shaped to form the face plate portion of such a unitary receptacle, and have upstanding mold pieces therein to form the voids in the face plate portion, (which ultimately become the receptacle openings 13 and screw opening 22). Such portions of the mold may also serve as points upon which to secure the internal conductors of the unitary device during the molding process. A corresponding back side mold may be shaped to form the housing portion of the structure, and adapted to mate with the mold half which forms the cover plate portion. It also may have upstanding mold portions to form the various openings which are described herein as being in the back of the housing portion of the unitary receptacle. When such a pair of mold halves are placed together and filled with a suitable electrically insulating material such as rubber or plastic, the internal conductors can be fixedly enclosed within such a rubber or plastic body in a substantially one step molding process. The present invention may also be produced by separately molding different portions of the desired resultant article, and then pre-assembling those parts, by fusing the premolded parts together, or by uniting the premolded parts by the use of suitable fasteners or cement for example such as epoxy resin glues or other types of cements. Some of the openings in the unitary receptacle as described therein may require external boring of the completed receptacle body after molding by one of the methods already described above herein.

It can readily be seen that the unitary or pre-assembled receptacle greatly reduces the time required to install the outlet assembly, presents a system in which true alignment to structural members is readily provided, and in which full contact of the cover plate on the surface panel is insured. Safety is enhanced by the elimination of exposed metal, by the impossibility of removing the cover plate, and by the wire installation technique which eliminates folded excess conductors inside a junction box. In addition, the invention facilitates electrical system repair by permitting easy removal of the entire assembly.

It will be appreciated that unitary or pre-assembled switches or other electrical fixtures can be utilized for installation from without the light-frame structure in which they are to be installed, in a manner similar to that described above in connunction with unitary receptacles.

Although specific components and designated proportions and arrangements of elements have been stated in the above description of the preferred embodiments of this invention, other suitable equivalent components and arrangements of elements may be used for satisfactory results and various degrees of quality, or other modifications may be made in this system to synergize or enhance its construction to thereby increase its utility. It will be understood that such changes of details, materials, arrangements of parts and uses of the invention described and illustrated herein are intended to be included within the principles and scope of the claimed invention.

What is claimed is:

1. A pre-assembled electrical receptacle suitable for installation in light-frame building constructions, comprising:
   internal electrical conductors;
   a housing portion for said internal electrical conductors;
   a cover plate portion whose edges comprise flanges overhanging the sides of said housing portion;
   said housing and cover plate portions comprising electrically insulating material substantially surrounding said internal electrical conductors, said cover plate having openings therein to receive the prongs of electrical plugs for contacting said prongs with said internal conductors and said housing portion having means for contacting the wires of an electrical distribution cable to said internal conductors;
   and at least one through-hole extending from the front surface of the cover plate portion through said receptacle for attaching said receptacle to a structural member in light-frame building constructions.

2. The receptacle of claim 1 additionally comprising a wedge-shaped key insert of electrically insulating material and a corresponding opening in the housing portion of said receptacle for said key which opening intersects another opening for receiving an end of said cable, for firmly attaching said receptacle to an electrical distribution cable.

3. The receptacle of claim 1 wherein said through-hole extends in a direction perpendicular to the front surface of the cover plate portion of the receptacle.

4. The receptacle of claim 1 wherein said through-hole extends in a direction oblique to the front surface of the cover plate portion, said oblique through-hole emerging through the housing portion of said receptacle for attachment of said receptacle to a surface adjacent the side of said housing portion.

5. The receptacle of claim 1 wherein the housing portion thereof has a rectilinear channel extending across its width for mounting on a structural member in light-frame building constructions.

6. The receptacle of claim 5, wherein said channel divides the back of said housing portion of said receptacle into two parts, said openings for receiving the end of an electrical distribution cable including holes for contacting the wires of said cable being in one of said parts, and a second opening for receiving the end of an electrical distribution cable, including second holes for contacting the wires of said cable to said internal conductors, being in the second of said parts.

7. The receptacle of claim 1 wherein said electrically insulating housing portion and cover plate portion are a single, integral structure.

8. A pre-assembled electrical switch apparatus suitable for installation in light-frame building constructions, comprising:
   internal electrical switching means;
   a housing portion for said internal electrical switching means;
   a cover plate portion whose edges comprise flanges overhanging the sides of said housing portion;
   said housing and cover plate portions comprising electrically insulating material substantially surrounding said internal electrical switching means, said cover plate having at least one opening therein for passage of a member for operating said switching means, and said housing portion having means for contacting the wires of an electrical distribution cable to said internal electrical switching means;
   and at least one through-hole extending from the front surface of the cover plate portion through said switch apparatus for attaching said switch apparatus to a structural member in light-frame building constructions.

9. An electrical terminal such as a receptacle or switch, comprising internal electrical conductors and a housing portion for said internal electrical conductors, said housing comprising electrically insulating material substantially surrounding said internal electrical conductors,
   and a wedge-shaped key including a locking tip portion and a corresponding opening for said key in the housing portion of said terminal, said opening intersecting another opening for receiving an end of an electrical distribution cable, for firmly attaching said terminal to an electrical distribution cable.

10. The electrical terminal of claim 9, wherein said terminal additionally comprises a cover plate portion, for concealing the housing portion of the terminal.

* * * * *